March 3, 1953  J. L. SWITZER  2,629,956
FLUORESCENT PRINTING
Filed Feb. 25, 1943

INVENTOR
Joseph L. Switzer
BY Ely & Frye
ATTORNEYS

Patented Mar. 3, 1953

2,629,956

UNITED STATES PATENT OFFICE 2,629,956

FLUORESCENT PRINTING

Joseph L. Switzer, Cleveland Heights, Ohio

Application February 25, 1943, Serial No. 477,069

13 Claims. (Cl. 41—26)

This invention relates to methods of surface ornamentation and products thereof. More particularly, this invention relates to methods of printing or ornamenting surfaces with dyes and also relates to the products of such methods; the invention is especially useful in printing fluorescent reproductions and in providing fluorescent surface ornamentation. This application is, in part, a continuation of my copending joint application with Robert C. Switzer for "Color Separation," Serial No. 434,080, filed March 10, 1942, now Patent No. 2,434,019.

Although striking fluorescent reproductions may be printed, as, for example, by the methods taught in the U. S. Patents No. 2,277,169 and No. 2,302,645 to Joseph L. Switzer and Robert C. Switzer, where fluorescent printing is to be viewed under visible light as well as under filtered ultraviolet light, the printing often had a rather pastel appearance. In other words, colored fluorescent inks tend to be "weak" or pale, particularly when such fluorescent inks are contrasted with the strong non-fluorescent inks which have been developed in recent years.

When the chroma of any surface coating composition was weak, the prior art taught two general methods of overcoming the weakness, first, by mechanically increasing the thickness of the coating, or second, by increasing the concentration of the chromatic agent in the composition. For example, a painter follows the first alternative by applying several coats of paint when one coat will not "cover" the surface; a printing ink manufacturer will follow the second alternative by increasing the concentration of pigment or dye in his ink when the ink is pale. The printing industry has been limited, for all practical purposes, to the second alternative, since there are definite limits to the thickness of ink which can be deposited on a receiving surface from a mechanical printing plate or surface; any attempt to exceed this limit will result in smearing the reproduction and in loading up the plates with ink. There is also a practical limit to which a given pigment or dye may be concentrated in a printing ink. As the concentration of a pigment in a printing ink is increased, the ink loses printability and as the concentration of a dye in a printing ink is increased, the ink tends to become "muddy" and to lose its purity and cleanness of color. The art has succeeded in extending the limitation with respect to dyes by developing new color lakes and dyes which will permit a greater concentration of the chromatic agent without excessive loss of cleanness.

Unfortunately, none of the means available to the prior art for overcoming low color intensity in non-fluorescent printing could be employed in printing fluorescent inks, with the possible exception, of course, of discovering new fluorescent agents. Fluorescent pigments, with a few exceptions, are of notoriously low intensity, both as to chroma and fluorescence. Consequently, to obtain optimum brightness, pigmented fluorescent inks would require coating thicknesses which are impossible to print or pigment concentrations which destroy the printability of the inks. Fluorescent dyes are generally characterized by the fact that optimum fluorescence is obtained at a very low concentration of the dye in the carrier, which concentration of the dye for optimum fluorescence is appreciably lower than the concentration at which maximum color intensity is obtained. In fact, at concentrations for maximum color intensity, fluorescent dyes lose most, if not all, of their fluorescence. The maintenance of a low dye concentration is of particular importance in dyes which exhibit the phenomenon of "daylight fluorescence," as disclosed in greater detail in the copending application of Joseph L. Switzer, Robert C. Switzer and Richard A. Ward for Light-Responsive Fluorescent Media, Serial No. 455,610, filed August 21, 1942. Increasing color concentration by laking fluorescent dyes has been unsuccessful because all known color lakes of fluorescent dyes are wholly non-fluorescent.

I have overcome the low color intensity of printed fluorescent inks, and particularly daylight fluorescent inks, by the method of printing disclosed in the following specification. It is the object of this invention, therefore, to provide a method of printing fluorescent inks with customary printing plates and yet create a body of dissolved dye on the printed surface having both high chroma and strong fluorescence. Broadly, it is an object of this invention to print characters, reproductions, and like matter having a high color intensity with inks containing dyes which were characterized by a low color intensity when printed by prior art methods. Specifically, it is an object of this invention to provide a method of printing fluorescent inks, and particularly daylight fluorescent inks, so that the printed subject matter will have both high color intensity and strong fluorescence.

It is also an object of this invention to provide a method of printing inks containing dyes so that a high color intensity is obtained without creating muddiness in the color of the printed matter. It is another object of this invention to provide a method of printing which will permit the creation of delicate and very gradual tints and shades in tonal and multicolor printing.

It is a still further object of this invention to provide a method of printing which will protect the printed matter and prolong the fluorescent life thereof in the case of daylight fluorescent inks and which will also avoid puckering of the base sheet when the matter is printed on paper and is subjected to changes in humidity.

While the foregoing statement of the objects of my invention has been directed specifically to the art of printing, it will be shown that my invention is useful in other applications in the broad art of surface ornamentation. Nor is my invention necessarily restricted in its utility to the ornamentation of surfaces intended primarily for visual observation. For example, in preparing sketches and the like, and particularly in preparing fine line drawings, artists and draftsmen would usually prefer to work in a thin medium, such as ink, the term "thin" being used in this instance to describe both the viscosity of the medium and the thickness when applied. The use of such thin mediums is limited in many respects, however, by a problem similar to that encountered in printing inks, namely, the problem of obtaining a high intensity of color and/or fluorescence. The problem of obtaining a high intensity of fluorescence has been of particular importance in the creation of originals to be reproduced by multi-color printing processes. The manner in which I employ my invention to overcome problems outside the art of printing is disclosed in the following specification. Other and further objects of this invention, therefore, will be apparent from the following specification, claims, and drawings in which:

Figure 1:
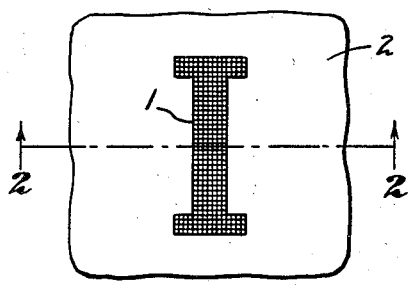
Fig. 1 is an enlarged plan view of a portion of a sheet illustrating an intermediate stage in printing according to my invention.

In general, my method of printing with a fluorescent dye, which, for effective brightness, requires a mechanical depth in solution greater than the thickness of ink which can be deposited by a printing plate, comprises the following steps: First, the dye crystals are ground into a printable carrier in a manner similar to the manner in which insoluble pigments are ground into a printing ink. If the dye crystals are insoluble in the carrier, the resultant ink will be similar to a pigmented printing ink; if the dye crystals are soluble in the carrier, the high concentration of dye in the carrier will approach, if not equal or exceed, a saturated solution of the dye in the carrier. The dye ink (hereinafter referred to as "latent ink") is then printed on a base sheet from any suitable plates in block, dot and/or line structures delineating the characters or reproductions desired in the finished product.

Due to the extreme concentration of dye in the printed latent ink, the printed matter seldom bears any resemblance in color to the color of the characters or reproductions desired. For example, reproductions which are fiery red may be developed from dull blackish purple latent inks.

After the latent ink has been printed, the base sheet is then coated with a clear coating usually comprising a resin and a volatile solvent. The resin is a solvent for the dye and may be suitably plasticized, if necessary; the solvent is a mutual solvent for the dye and resin and is usually a mutual solvent for the carrier of the latent ink, as well. As the dye is wetted by the mutual solvent, the dye dissolves and flows up into the coating. By carefully controlling the rate of evaporation of the mutual solvent, usually by heat, the dispersion of the dye into the coating is also controlled. The extent of dispersion of dye in the resinous coating is controlled by regulating the evaporation of solvent from the coating so that, when the solvent is substantially completely evaporated, the dye will have been transmitted into the coating to the extent desired. The thickness of the coating and the extent of flow are chosen, of course, so that, when flow is arrested, the depth of dissolved dye will give the desired concentration of dye in the resin.

The general use of my method and the resultant products in the creation by hand of sketches, drawings, and the like differs primarily from the foregoing description of the use of the method in printing in that the ink is applied by pen or brush, rather than by printing plates or like mechanical means. In hand application by pen or brush, the carrier for the dye is also usually less viscous than the carrier of a printing ink. When carriers of extremely low viscosity are used in hand application, it is sometimes necessary to agitate the ink just before use in order to suspend the dye substantially equally throughout the ink; such agitation is seldom necessary in printing inks because of the greater viscosity of the carriers employed.

The brightness and purity of color and/or fluorescence obtained by the foregoing methods are excellent. The comparative muddiness of most pigmented inks becomes readily apparent. The high intensity obtained is most noticeable in daylight fluorescent delineations, where the apparently inconsistent results of optimum fluorescence and optimum color intensity are both obtained. The high fluorescence brightness is probably due to the state of suspension and low concentration of the dye dissolved in the resin and the high color intensity is probably due to the physical depth of the body of the dissolved dye. The depth of the body of the dissolved dye also gives a depth of delineation which, in some instances, creates an illusion approaching a third dimensional effect.

The sharpness and accuracy of delineations made according to my invention are also excellent. When a reproduction made according to my invention is contrasted with a reproduction made by orthodox methods, a slight softening and loss of harshness may be noticed. Such softening and loss of harshness is apparently not so much attributable to a slight bleed of the dye parallel to the coating, as was at first suspected, but is apparently due primarily to halation resulting from diffusion of light within the film; halation is particularly noticeable in fluorescent and daylight fluorescent delineations because the fluorescing molecules act as point sources of light, Why the dye tends to flow into the resin perpendicularly to the coating and retain detail, rather than to bleed parallel to the coating and thereby cause loss of detail, is not fully understood.

By way of illustration, but not by way of limitation, the following specific examples are given of the above generally described invention:

PRINTING INKS

Example 1

Parts (by weight)
1 Linseed varnish _____ 4
3 Linseed varnish _____ 4
Diatomaceous earth _____ 1
Tetramethyl diamino diphenyl ketonimine hydrochloride _____ 6

The dye and diatomaceous earth are ground into the mixed linseed varnish to form a pigmented printing ink which will contain some dye in solution. The diatomaceous earth serves as a diffusion retardant for the dye and as a drier for the varnish in the printed ink. The developed ink fluoresces a bright yellow-green (primary for additive colors) under near ultraviolet and is yellow under white light.

Example 2

Parts (by weight)
Linseed oil-modified alkyd resin _____ 8
Alumina hydrate _____ 4
Ethyl ester of meta monoethylaminophenol-phthalein hydrochloride (a xanthene dye) __ 2

The dye and alumina hydrate are ground into the oil-modified resin, as in Example 1. The developed ink fluoresces a bright salmon-yellow under near ultraviolet and is a pinkish-salmon under white light.

Example 3

Parts (by weight)
Long oil alkyd resin _____ 8
Casein _____ 1
Alumina hydrate _____ 3
Meta diethylaminophenol-phthalein base (a xanthene dye) _____ 2

The dye, hydrate, and casein are ground into the oil-modified resin, as in Example 1, the casein serving as a diffusion retardant for the dye. The developed ink fluoresces a bright orange-red and is cold red under white light.

Example 4

Parts (by weight)
Heavily-bodied soy bean oil _____ 8
Sodium salt of 4 methyl 7 hydroxy coumarine _ 6
Magnesia _____ 3

The dye and magnesia are ground into the oil, as in Example 1. The developed ink fluoresces a pure blue and is nearly colorless under white light.

DRAFTING INKS

Example 5

Parts (by weight)
White waterproof drafting ink _____ 16
Tetramethyl diamino diphenyl ketonimine hydrochloride _____ 1

The dye is ground into the drafting ink. The developed ink fluoresces a bright yellow-green and is yellow under white light.

Example 6

Parts (by weight)
White waterproof drafting ink _____ 16
Meta diethylaminophenol-phthalein hydrochloride (a xanthene dye) _____ ¼

The dye is ground into the ink as in Example 5. The developed ink fluoresces a bright red and is cold red under white light.

Example 7

Parts (by weight)
White waterproof drafting ink _____ 15
Royal blue waterproof drafting ink _____ 1
Sodium salt of 4 methyl 7 hydroxy coumarine _ 1

The dye is ground into the inks as in Example 5. The developed ink fluoresces a bright blue and is royal blue under white light.

DEVELOPING COMPOSITIONS

Example 8

Butyl alcohol-modified carbamide-formaldehyde resin (butyl alcohol-modified urea formaldehyde resin) __ 50% (by weight solid resin).
Butanol _____ 50% (by weight).

The butyl alcohol-modified urea-formaldehyde resin, dissolved in butanol according to the above formula, is sprayed, roll-coated, brushed, or otherwise applied to the surface upon which inks made according to Examples 1 to 7 have been applied.

Example 9

Cyanuramide-formaldehyde resin (melamine-formaldehyde resin) _____ 40% (by weight solid resin).
Butanol _____ 30% (by weight).
Toluol _____ 30% (by weight).

The melamine-formaldehyde resin, dissolved in a butanol-toluol mixture according to the above formula, is sprayed, roll-coated, brushed, or otherwise applied to the surface upon which inks made according to Examples 1 to 7 have been applied.

Example 10

Glycol-phthlate resin ____ 12.5% (by weight solid resin).
Nitrocellulose _____ 12.5% (by weight).
Ethyl acetate _____ 56.25% (by weight).
Toluol _____ 18.75% (by weight).

The glycol-phthlate resin and nitrocellulose are mixed in the ethyl acetate and toluol. A developing composition according to the above formula may be sprayed, roll-coated, brushed, or otherwise applied to a surface upon which inks made according to Examples 1 to 3, 5, and 6 have been applied. A developing composition made according to this example tends to react with dyes of the type employed in Examples 3 and 7 and, therefore, is not recommended for use with such inks.

From the foregoing examples, it is apparent that I have disclosed a palette of printing inks (particularly suited for planographic printing) for mechanical application to receiving surfaces and a palette of drafting inks for manual application to receiving surfaces. Modification of the inks for other types of mechanical application, i. e., typographic, intaglio, and screen process printing, requires a modification of the carrier as to viscosity, tack, and the like, similar to variations of these characteristics in conventional pigmented inks. Similarly, hand-applied mediums, such as brush-applied oil colors and water colors, crayons, and the like, will differ primarily from the disclosed drafting inks by the substitution of suitable non-reactive carriers.

Figure 2:
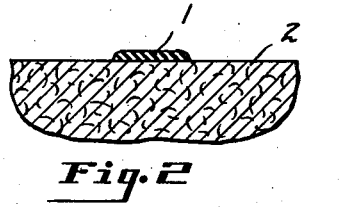
Fig. 2 is an enlarged fragmentary section taken along the line 2—2 of Fig. 1.

Figs. 1 to 4a illustrate my method as employed in the development of my inks applied to a suitable supporting surface in line or block delineations. In Figs. 1 and 2, the latent ink 1 is applied as the letter "I" on an area of paper 2. Obviously, if the ink 1 is printed, as by lithography, an ink, as disclosed in Examples 1 to 4, will be employed; if drawn by pen, a drafting ink, as disclosed in Examples 5 to 7, will be employed.

Figure 4:
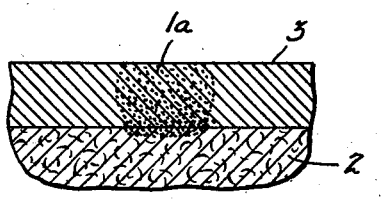
Fig. 4 is a view similar to Fig. 2 but taken along the line 4—4 of Fig. 3.
Figure 3:
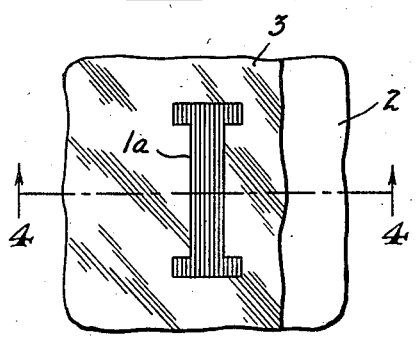
Fig. 3 is a view similar to Fig. 1 showing a portion of a sheet printed according to my invention.
Figure 4A:
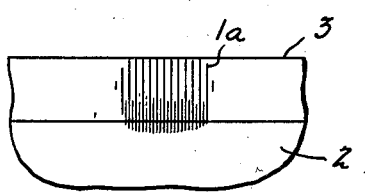
Fig. 4a is a view similar to Fig. 4 shaded to show color.

Preferably after the latent ink has dried, a transparent developing composition, as disclosed in Examples 8 to 10, is applied by roll-coating, for example, to the surface of the paper 2. As the developing composition is applied, the dye in the ink 1 diffuses or dissolves into the developing composition to form the developed delineation 1a, as shown in Figs. 3 and 4. Diffusion of the dye, i. e., the concentration of the dye in the developing composition and the depth of diffused dye, is arrested by "setting" the developing composition to form the film 3. In the developed delineation within the film 3, the dye will be in a sufficiently low concentration to permit strong fluorescence and yet, because of the mechanical depth of the delineation 1a, the effect of high color intensity is also obtained. The purity of color and absence of muddiness in the developed delineation 1a is also very noticeable.

Figure 5:
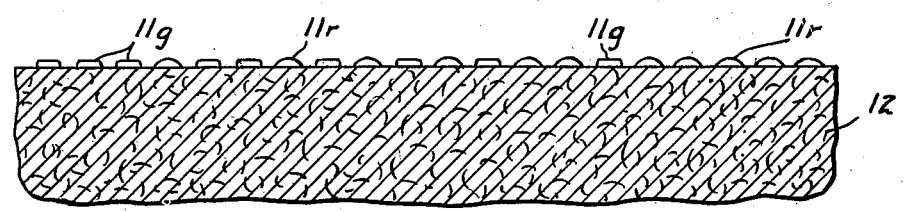
Fig. 5 is an enlarged, partly diagrammatic, fragmentary section taken at a stage similar to that shown in Fig. 2 but illustrating the application of my invention to multi-color printing.
Figure 6:
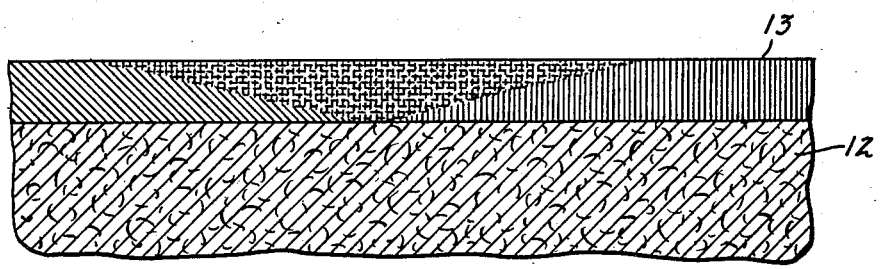
Fig. 6 is an enlarged, partly diagrammatic, section of the sheet shown in Fig. 5 showing the sheet at the completion of my method.

Figs. 5 and 6 illustrate diagrammatically my method as employed in printing tonal and multicolor reproductions. Fig. 5 shows diagrammatically the manner of printing fluorescent inks which shade from the additive primary, green, through yellow to the additive primary, red. Dot structures of latent green ink (indicated as rectangular dots 11g) and of latent red ink (indicated as semicircular dots 11r) are printed on the paper supporting surface 12 so that the relative concentration of dot structures of the two inks, per unit of area, will vary from 100% latent green to 100% latent red. A developing composition is then applied and set to form a film 13, as in setting the film 3, so that the dyes in the latent inks will disperse into the film 13. The resultant fluorescent printing will shade very gradually from the primary green through the secondary yellow to primary red, the gradualness of shading being indicated by the "color wedges" shown in Fig. 2. (No attempt is made to indicate the actual diffusion of the dyes, as in Fig. 4.) The exceptionally gradual shading is due more to the dispersion of light within the film 13 than to the mixture of the dyes in the film. Just as both strong fluorescence and high color intensity are obtained in the developed block structure illustrated in Figs. 3 and 4, so are these results obtained in the tonal structures illustrated in Figs. 5 and 6.

My method is particularly useful in preparing original maps, drawings, and like renderings for reproductions according to the method of "Color Separation" as disclosed in the copending application of Joseph L. Switzer and Robert C. Switzer, Serial No. 434,080, filed March 10, 1942, which method utilizes the phenomenon that many fluorescent colors are substantially monochromatic. Heretofore, the difficulty presented by many fluorescent drafting inks were that they were either weakly colored under visible light or weakly fluorescent under ultraviolet. My drafting inks, however, are very satisfactory because the dye crystals in the latent inks are often strongly colored, or, if not, may be fortified with strong insoluble subtractive pigments. To prepare an original drawing to be reproduced by the above color separation method, therefore, an original drawing is prepared with latent inks as disclosed in Examples 5 to 7. After the latent inks have dried, the inks are developed with a suitable developing composition to produce an original having strong fluorescence and high color concentration. By selecting a palette in which the developed fluorescent colors are substantially monochromatic, the colors are accurately separated and highlight touch-up is avoided by photographing an original rendering under ultraviolet and through successive primary color filters, such as the usual Wratten filters. The successive photographs are positives showing only (except for slight ghost images which drop out in conventional methods of producing printing plates) an image of a primary color in the original. The substantially monochromatic colors are, therefore, said to be "filterably distinct."

In addition to serving as a developing composition for the latent inks, the resulting films often improve the printed articles. For example, in large reproductions exposed to atmosphere, the film protects the paper from inequal exposure to atmospheric moisture and thus prevents wrinkling between inked and uninked areas, a common fault of many such reproductions produced by conventional methods. Also, where the originals produced with my latent inks are subject to handling, the film produced by the developing composition serves as an excellent fixative.

A property of the resinous ingredients of the developing compositions disclosed is that these ingredients are solvents for the dyes of the latent inks. It is preferred that the resinous ingredients of the developing compositions act as true or apparent solvents for the dyes of the latent inks, first, in order to maintain the dye in a state of solution in the set film and thereby obtain the characteristic purity of color and fluorescence of dissolved dyes, and second, in order to stabilize many dyes, as, for example, when daylight fluorescent dyes are carried in resinous ingredients as disclosed in the copending application of Joseph L. Switzer and Robert C. Switzer for "Organic Fluorescent Compositions," Serial No. 452,522, filed July 27, 1942, now abandoned in favor of their copending continuation-in-part application of the same title, Serial No. 200,306, filed December 11, 1950.

In the examples disclosed, diffusion is controlled and arrested by "setting" the developing composition to form the dye-carrying film 13. Such control and arrest of diffusion is usually obtained by the application of heat to evaporate the solvent and/or to polymerize the resinous, i. e., film-forming, ingredients of the developing composition. Heat to control the "setting" of the film is usually applied by means of baking ovens, infra-red lamps, or like controllable means. Depending upon the rate of diffusion from the latent ink, however, air-drying developing compositions may be employed in some instances.

The primary functions of the developing compositions are, first, to diffuse, i. e., dissolve, the dye carried by the latent ink, second, to arrest diffusion, and third, to become the effective carrier of the dissolved dye. It should be apparent that any developing composition which will perform these functions will be satisfactory and that my developing compositions are not necessarily restricted to the disclosed type of composition which comprises a dye-dissolving resinous ingredient and a mutual solvent for the dye and resinous ingredient. For example, the developing composition may consist simply of a thermoplastic resinous material which will be comparatively fluid and/or possess appreciable dye-dissolving properties at elevated temperatures and which will be relatively immobile and possess no appreciable dye-dissolving properties at normal room or atmospheric temperature.

In the foregoing examples of printing inks, the concentration of dye in the carrier is greatly in excess of the concentration for maximum fluorescence whereas in the examples of drafting inks, the concentration of dye in the carrier may be only slightly in excess of the concentration for maximum fluorescence because the carrier for the drafting ink is largely volatile. The concentration of dye in either ink, when the ink is printed and dried, will be greatly in excess of the concentration for maximum fluorescence as is evidenced by the fact that such dried latent inks usually exhibit little or no fluorescence. The concentration for maximum fluorescence, that is, the concentration of a dye in a carrier at which the dye will exhibit maximum fluorescence efficiency varies with each dye and each carrier and must, therefore, be determined experimentally, bearing in mind the general rule pointed out in the above identified application for Light-Responsive Fluorescent Media that the concentration for maximum fluorescence decreases as the wave-length of the fluorescent light increases and that the concentration becomes increasingly critical as the wave increases. Thus, as a general rule, the optimum concentration of a blue or green fluorescing dye may range from five to ten percent whereas the optimum concentration for a red fluorescing dye is approximately one percent.

It is also to be noted that the latent inks may contain diffusion retardants. The necessity for such diffusion retardants will be determined by several factors, such as the rate of diffusion of the dye out of the carrier employed in the ink, the dispersion of the dye in the latent ink, the rate of diffusion of the dye into the developing composition to be employed, and the rates of diffusion of other latent inks into the carrier where a palette of latent inks are employed in multicolor work.

In the foregoing specification and in the following claims, unless otherwise specified, the term "ink" is to be understood to include any surface ornamenting medium and the term "printing" is to be understood to include manual as well as mechanical application of the latent ink. Further, while this invention is of particular importance with respect to the printing of fluorescent matter, it is to be understood that it is also applicable to the printing of subtractive colored matter. This invention, therefore, is not limited to the particular examples, embodiments, or uses disclosed, either in whole or in part, but may be modified by those skilled in the art; this invention, therefore, is limited by the appended claims and not by the foregoing specification describing particular and preferred embodiments of my invention.

What is claimed is:

1. The method of decorating articles comprising the steps of applying to the surface of an article a medium comprising a soluble fluorescent dye dispersed in a carrier containing a nonvolatile constituent, the concentration of said dye with respect to said constituent being greater than the concentration for maximum fluorescence of said dye in said constituent, applying a developing composition over said medium to diffuse said dye into said developing composition said developing composition comprising a relatively liquid translucent resinous composition into which said dye will diffuse and containing a resin of the class consisting of amide-aldehyde, glycol-phthalate, and cellulose ester resins, and arresting the diffusion of said dye in said developing composition by converting said relatively liquid composition into a relatively solid translucent resinous film coated on the surface of the article, said developing composition having been applied in a thickness sufficient to dilute the dye diffused therein to a concentration of dye in said developing composition which is not substantially greater than the concentration for maximum fluorescence and said composition thus develops a fluorescent decoration in a film adhered to the surface of the article.

2. The method of decorating articles comprising the steps of applying to the surface of an article a medium comprising a soluble fluorescent dye dispersed in a carrier containing a nonvolatile constituent, the concentration of said dye with respect to said constituent being greater than the concentration for maximum fluorescence of said dye in said constituent, applying a developing composition over said medium to diffuse said dye into said developing composition, said developing composition comprising a solution of a volatile solvent and a film-forming translucent resin in which said dye will dissolve, said resin being a resin of the class consisting of amide-aldehyde, glycol-phthalate, and cellulose ester resins, and arresting the diffusion of said dye in said developing composition by evaporating said solvent to set said composition into a relatively solid translucent resinous film before the concentration of dye dissolved into said resin substantially exceeds the concentration for maximum fluorescence, said developing composition having been applied in sufficient thickness to develop a fluorescent decoration in the resinous film thus formed and adhered to the surface of the article.

3. The method of printing an article with colored fluorescent inks comprising the step of printing on a receiving surface of the article a latent ink containing a dye which exhibits color and fluorescence when in solution, the concentration of the dye in said ink when dried being greater than the concentration at which said dye exhibits maximum fluorescence, drying said ink, applying to the printed surface of the article a developing composition comprising a solution of a volatile solvent and a resin in which said dye is soluble, said resin being a translucent film-forming resin of the class consisting of amide-aldehyde, glycol-phthalate, and cellulose ester resins, allowing the dye to diffuse into the developing composition, and arresting the diffusion of the dye before the concentration of the dye in the developing composition exceeds the concentration for maximum fluorescence of the dye in the resinous component of said developing composition by evaporating said solvent to set said composition into a relatively solid translucent film and thus develop a fluorescent decoration in the film thus formed and adhered to the surface of the article.

4. The method of printing an article with daylight fluorescent inks comprising the step of mechanically applying on a receiving surface of the article a latent ink containing a dye which exhibits daylight fluorescence when in solution, the concentration of the dye in said ink when dried being greater than the concentration at which said dye exhibits maximum daylight fluorescence, drying said ink, applying to the printed surface of the article a developing composition containing a resinous ingredient in a state in which the dye is soluble and a mutual solvent for the dye and resinous ingredient said resinous ingredient comprising a translucent film-forming resin of the class consisting of amide-aldehyde, glycol-phthalate, and cellulose ester resins, allowing the dye to diffuse into the developing composition, and arresting the diffusion of the dye before the concentration of the dye in the developing composition exceeds the concentration for maximum daylight fluorescence of the dye in the resinous ingredient by evaporating said solvent to set said composition into a relatively solid translucent film and thus develop a fluorescent decoration in the film thus formed and adhered to the surface of the article.

5. The method of decorating an article with daylight fluorescent inks comprising the step of manually applying on a receiving surface of the article a latent ink containing a dye which exhibits daylight fluorescence when in solution, the concentration of the dye in said ink when dried being greater than the concentration at which said dye exhibits maximum daylight fluorescence, drying said ink, applying to the printed surface of the article a developing composition containing a resinous ingredient in a state in which the dye is soluble and a mutual solvent for the dye and resinous ingredient, said resinous ingredient comprising a translucent film-forming resin of the class consisting of amide-aldehyde, glycol-phthalate, and cellulose ester resins, allowing the dye to diffuse into the developing composition, and arresting the diffusion of the dye before the concentration of the dye in the developing composition exceeds the concentration for maximum daylight fluorescence of the dye in the resinous ingredient by evaporating said solvent to set said composition into a relatively solid translucent film and thus develop a fluorescent decoration in the film thus formed and adhered to the surface of the article.

6. As an article of manufacture, an article comprising a base having an ink receiving surface, a latent ink applied in a delineated area on said surface, said ink containing a dye which exhibits color and fluorescence when in solution, a translucent resinous film applied over said ink, and dye from said ink dissolved in said film in a delineated area substantially congruent with the area of said receiving surface carrying said ink, said dissolved dye being in a concentration less than a concentration exceeding the optimum concentration for fluorescence.

7. As an article of manufacture, an article comprising a base having an ink receiving surface, a plurality of latent inks dispersed on said surface in adjacent tonal structures, each of said inks containing a dye which exhibits fluorescent when in solution, a translucent resinous film applied over said inks, and dyes from said inks dissolved in said film in concentrations less than concentrations exceeding the optimum concentration for fluorescence, said dyes in said film being dissolved in areas substantially congruent with the area of said tonal structures.

8. A fluorescent article as defined in claim 6 in which said dye is a daylight fluorescent dye and said resinous film comprises a series of the class consisting of amid-aldehyde, glycol-phthalate, and cellulose ester resins.

9. A fluorescent article as defined in claim 8 in which said resin is an alcohol-modified carbamide-formaldehyde resin.

10. A fluorescent article as defined in claim 8 in which said resin is a butyl alcohol-modified urea-formaldehyde resin.

11. A fluorescent article as defined in claim 8 in which said resin is a cyanuranide-formaldehyde resin.

12. A fluorescent article as defined in claim 11 in which said resin is a melamine-formaldehyde resin.

13. A fluorescent article as defined in claim 8 in which said resin is a nitro-cellulose.

JOSEPH L. SWITZER.

REFERENCES CITED

The following references are of record in the file of this patent:

UNITED STATES PATENTS

| Number | Name | Date |
|---|---|---|
| 1,783,606 | Dreyfus | Dec. 2, 1930 |
| 1,939,219 | Mees | Dec. 12, 1933 |
| 1,965,257 | Poschel | July 3, 1934 |
| 2,008,290 | Murray | July 16, 1935 |
| 2,038,516 | McIntosh | Apr. 21, 1936 |
| 2,040,170 | Eader | May 12, 1936 |
| 2,108,503 | Murray | Feb. 15, 1938 |
| 2,149,993 | Fonda | May 7, 1939 |
| 2,219,205 | Boente | Oct. 22, 1940 |
| 2,224,270 | Sanders | Dec. 10, 1940 |
| 2,255,696 | Clifford | Sept. 9, 1941 |
| 2,276,718 | Crosby | Mar. 17, 1942 |
| 2,277,169 | Switzer et al. | Mar. 24, 1942 |
| 2,278,114 | Murray et al. | Mar. 31, 1942 |
| 2,286,780 | Yule | June 16, 1942 |
| 2,298,589 | Yule | Sept. 29, 1942 |
| 2,297,033 | Stahr | Sept. 29, 1942 |
| 2,319,079 | Murray et al. | May 11, 1943 |
| 2,360,587 | Sanders | Oct. 17, 1944 |
| 2,413,559 | Greenlees | Dec. 31, 1946 |